United States Patent
Hazel et al.

(10) Patent No.: US 11,416,466 B2
(45) Date of Patent: *Aug. 16, 2022

(54) DATA EDGE PLATFORM FOR IMPROVED STORAGE AND ANALYTICS

(71) Applicant: CHAOSSEARCH, INC., Andover, MA (US)

(72) Inventors: Thomas Hazel, Boston, MA (US); David Noblet, Londonderry, NH (US); Eric Mann, Arlington, MA (US); Grant Mills, Littleton, MA (US)

(73) Assignee: CHAOSSEARCH, INC., Andover, MA (US)

( * ) Notice: Subject to any disclaimer, the term of this patent is extended or adjusted under 35 U.S.C. 154(b) by 1041 days.

This patent is subject to a terminal disclaimer.

(21) Appl. No.: 15/996,328

(22) Filed: Jun. 1, 2018

(65) Prior Publication Data

US 2018/0349425 A1 Dec. 6, 2018

Related U.S. Application Data

(60) Provisional application No. 62/630,092, filed on Feb. 13, 2018, provisional application No. 62/548,341, filed on Aug. 21, 2017, provisional application No. 62/514,669, filed on Jun. 2, 2017.

(51) Int. Cl.
*G06F 16/22* (2019.01)
*G06F 16/38* (2019.01)
*G06F 16/83* (2019.01)
*G06F 16/2455* (2019.01)

(52) U.S. Cl.
CPC ...... *G06F 16/2282* (2019.01); *G06F 16/2455* (2019.01); *G06F 16/38* (2019.01); *G06F 16/83* (2019.01)

(58) Field of Classification Search
CPC ...... G06F 16/2282; G06F 16/83; G06F 16/38; G06F 16/2455
USPC .................................................. 707/755
See application file for complete search history.

(56) References Cited

U.S. PATENT DOCUMENTS

| | | | | |
|---|---|---|---|---|
| 5,129,082 A | * | 7/1992 | Tirfing | G06F 16/10 |
| 6,654,754 B1 | * | 11/2003 | Knauft | G06F 21/10 |
| 6,804,682 B1 | * | 10/2004 | Kemper | G06F 8/72 |
| 7,548,928 B1 | * | 6/2009 | Dean | H03M 7/3084 |
| 7,567,973 B1 | * | 7/2009 | Burrows | G06F 16/22 |
| 7,933,935 B2 | * | 4/2011 | Idicula | G06F 16/83 |
| | | | | 707/811 |
| 8,234,350 B1 | | 7/2012 | Gu et al. | |

(Continued)

*Primary Examiner* — Ashish Thomas
*Assistant Examiner* — Nargis Sultana
(74) *Attorney, Agent, or Firm* — Procopio, Cory, Hargreaves & Savitch LLP.

(57) ABSTRACT

Disclosed are system and methods for processing and storing data files, using a data edge file format. The data edge file separates information about what symbols are in a data file and information about the corresponding location of those symbols in the data file. The described technique for converting a source file comprising symbols into a data edge file includes: generating a locality file of symbol location from the source file to identify locations of the symbols in the source file, generating a symbol file to identify symbols in the source file, and then modifying the locality file of symbol location to associate each symbol from the symbol file with a location in the source file.

26 Claims, 11 Drawing Sheets

(56) References Cited

U.S. PATENT DOCUMENTS

| | | | | |
|---|---|---|---|---|
| 8,661,069 B1* | 2/2014 | Cox | G06F 16/951 | 707/826 |
| 2003/0033588 A1* | 2/2003 | Alexander | G06F 9/54 | 717/107 |
| 2003/0033594 A1* | 2/2003 | Bowen | G06F 30/30 | 717/141 |
| 2003/0105620 A1* | 6/2003 | Bowen | G06F 30/33 | 703/22 |
| 2004/0237036 A1* | 11/2004 | Quist | H04L 67/02 | 715/236 |
| 2005/0203876 A1* | 9/2005 | Cragun | G06F 16/221 | |
| 2005/0240352 A1* | 10/2005 | Liang | G06Q 10/087 | 702/19 |
| 2007/0185914 A1* | 8/2007 | Prahlad | G06F 16/122 | |
| 2008/0077570 A1* | 3/2008 | Tang | G06F 16/3346 | |
| 2008/0168135 A1* | 7/2008 | Redlich | G06F 21/6218 | 709/204 |
| 2010/0069035 A1* | 3/2010 | Johnson | H04L 41/0816 | 455/404.1 |
| 2010/0070486 A1* | 3/2010 | Punaganti Venkata | G06F 16/972 | 707/722 |
| 2010/0138442 A1* | 6/2010 | Shinkawa | G06F 16/22 | 707/769 |
| 2010/0332456 A1* | 12/2010 | Prahlad | H04L 67/2852 | 707/664 |
| 2013/0007027 A1* | 1/2013 | Hazel | G06F 16/258 | 707/756 |
| 2013/0337789 A1* | 12/2013 | Johnson | H04W 40/244 | 455/414.1 |
| 2014/0279838 A1* | 9/2014 | Tsirogiannis | G06F 16/22 | 707/603 |
| 2016/0196112 A1 | 7/2016 | Edwards et al. | | |
| 2016/0253387 A1* | 9/2016 | Tidwell | H04L 63/1416 | 707/769 |
| 2016/0292263 A1 | 10/2016 | Ferrar | | |
| 2018/0081939 A1* | 3/2018 | Hopeman | G06F 16/221 | |
| 2018/0089224 A1* | 3/2018 | Muthuswamy | H04L 67/06 | |
| 2018/0249226 A1 | 8/2018 | Strader et al. | | |
| 2018/0338166 A1 | 11/2018 | Amiga et al. | | |

* cited by examiner

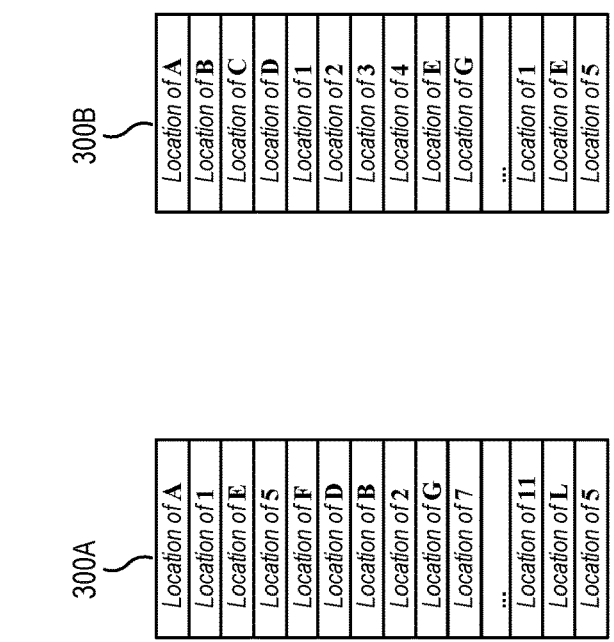
Fig. 3B
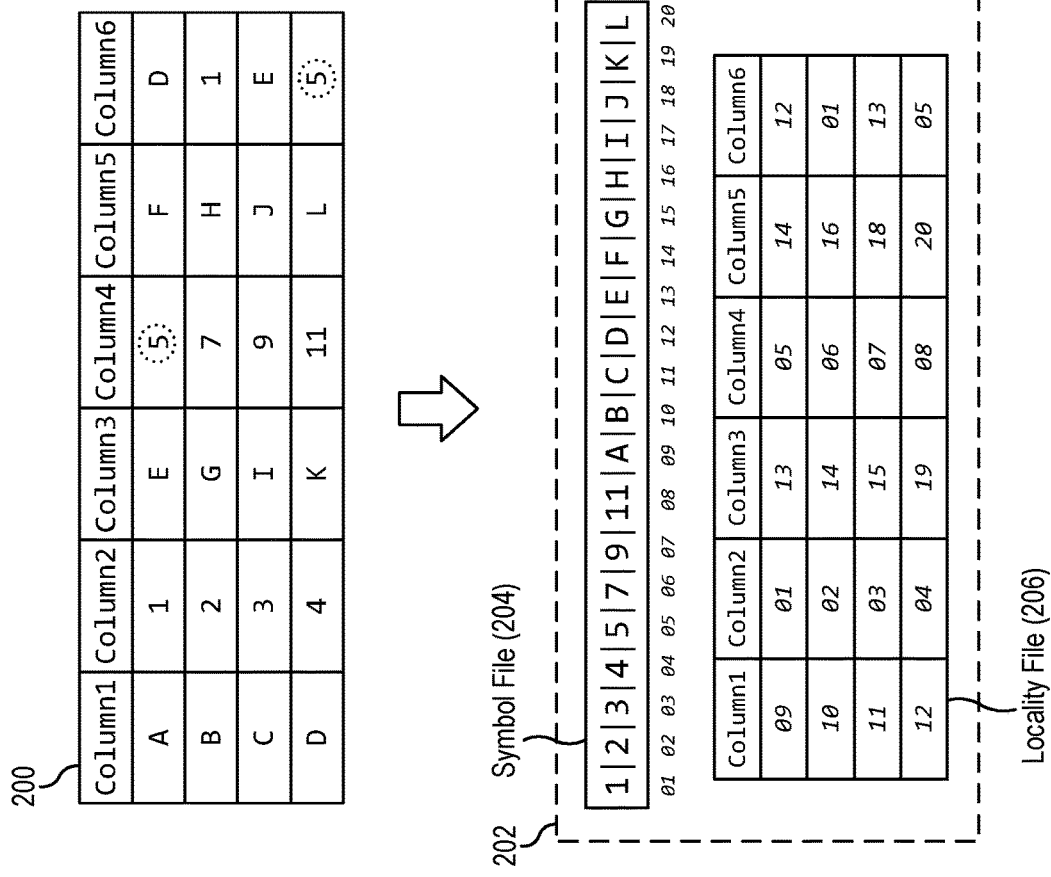
Fig. 3A
Fig. 2

DATA EDGE PLATFORM FOR IMPROVED STORAGE AND ANALYTICS

CROSS-REFERENCE TO RELATED APPLICATIONS

This application claims benefit of U.S. Provisional Application No. 62/514,669, filed on Jun. 2, 2017; U.S. Provisional Application No. 62/548,341 filed on Aug. 21, 2017; and U.S. Provisional Application No. 62/630,092 filed on Feb. 13, 2018, the entire contents of each of which are incorporated by reference herein.

FIELD OF TECHNOLOGY

The present disclosure relates generally to the field of object storage and file compression, more specifically, to systems and methods for efficiently storing and analyzing files in object storage.

BACKGROUND

Object storage is a type of data storage architecture that manages data as objects, which has become popular due to its prevalence in cloud storage services. Object storage may be considered a form of a distributed key/value storage service, where keys (unique indexes) and values (opaque data) is accessed via PUT, GET, and LIST interfaces. Consequently, such data is copied out to do variety of processing and/or analysis, where the results of this external execution is often put right back into object storage. The cycle of Extracting, Transforming, and Loading (ETL) data is the crux of the data swamp problem, though not the only issue. The advantages of object storage is its simplicity and scalability, encouraging cloud based storage services to be used as data lake repositories, where any type of data of any scale can be stored with the belief that value can be derived at a later date. However, this can lead to data being stored in a disjoined, disparate, and schema-less manner. Frequently this unstructured data is irregular, malformed, and chaotic, which is a direct result of object storage constructs.

Knowing what has been stored in object storage (e.g., "what's in your buckets") is another issue. In other words, understanding "what" to extract and "how" to extract it, is a major step before any type of ETL operation can be performed. The ability to group information into "like" subsets is important to efficiently use object storage. However, once this information has been identified, the actual data analysis is yet another significant hurdle to overcome.

Analysis of such disjoined, disparate, or malformed data traditionally requires either manual inspection via scaffolding such as via Hadoop™ (raw data) or manual transformation for analytic services such as Amazon Redshift™ (tabular data) and/or Elastic™ (text data). Whether manual inspection or transformation, each is time consuming, complicated, and costly; all contributing to the failures of "data lakes".

SUMMARY

Aspects presented herein provide a solution to these problems, enabling such functionality to be embedded directly into object storage; in essence, making object storage smarter and more capable. Aspects include a data format for universally representing any data source, with all its potential irregularities, e.g., everything from text based files such as Text, JSON, and CSV to image files such as PNG and JPG, and/or video files such as MPEG, AVI etc., so that the data can be virtually transformed and aggregated without considerable computation, while still providing built-in support for both relational queries and text searches. The data format can be manipulated without algorithmic execution and retrieve results at a speed of classic analytic solutions. The data format not only does not increase the actual storage footprint, but may actually decrease it. The data format may be configured to intrinsically describe itself such that it can be exported into other data formats without unnecessary conversion. Aspects of the data format may be referred to herein as "data edge" or "data edging."

Data edging provides an ability to discover and organize data generically and concurrently, an ability to organize and represent data consistently and uniformly, and ability to compress and catalogue data to theoretical minimums, and an ability to query and analyze data without Extract, Transform, Load. Data Edging comprises a storage format where any processing algorithm can be applied to create, organize, and retrieve information.

Data edging involves separating the symbols of a file from the symbols' location within the file. Compression technology may then use the symbol and location of the symbol as part of its algorithm and representation. Among others, symbols within a file may be, e.g., words, images, numbers, data, and time types, etc. For example, a document may comprise words (e.g., symbols) placed at particular locations (e.g., "locality") in a source file that should be reconstituted in a lossless approach. By separating the symbols and locations of the symbols, one can organize and compress data to its optimal state; mixing the two limits what any given compression algorithm can achieve. Symbols and locality of the symbols are not "like" entities and thus cannot be reduced easily.

According to one aspect of the present disclosure, a method of storing a file in object storage is provided. The method includes receiving, from an object storage system, a source file, and determining a plurality of symbols contained in the source file. The method further includes generating a symbol file associated with the source file and comprising a sorted unique set of the symbols from the source file. Each of the symbols is stored at a corresponding location within the symbol file. The method includes generating a locality file associated with the source file and comprising a plurality of location values referencing the symbol file. A location value at a respective position within the locality file represents an occurrence in the source file of a corresponding symbol identified by the respective location value. The symbol file and locality file associated with the source file are stored in the object storage system.

In another exemplary aspect, a computer apparatus for storing a file in object storage is provided. The computer apparatus includes memory, and at least one processor coupled to the memory. The processor is configured to receive, from an object storage system, a source file, and determine a plurality of symbols contained in the source file. The processor is further configured to generate a symbol file associated with the source file and comprising a sorted unique set of the symbols from the source file. Each of the symbols is stored at a corresponding location within the symbol file. The processor is further configured to generate a locality file associated with the source file and comprising a plurality of location values referencing the symbol file. A location value at a respective position within the locality file represents an occurrence in the source file of a corresponding symbol identified by the respective location value. The processor is further configured to store the symbol file and locality file associated with the source file in the object storage system.

According to another exemplary aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 2 is a block diagram depicting a structured data source file and a corresponding converted data edge file according to an exemplary aspect.

FIGS. 3A and 3B depicts representations of a locality file in row-based and column-based orientations according to an exemplary aspect.

DETAILED DESCRIPTION

Exemplary aspects are described herein in the context of a system, method, and computer program product for processing and analyzing data stored in object storage. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
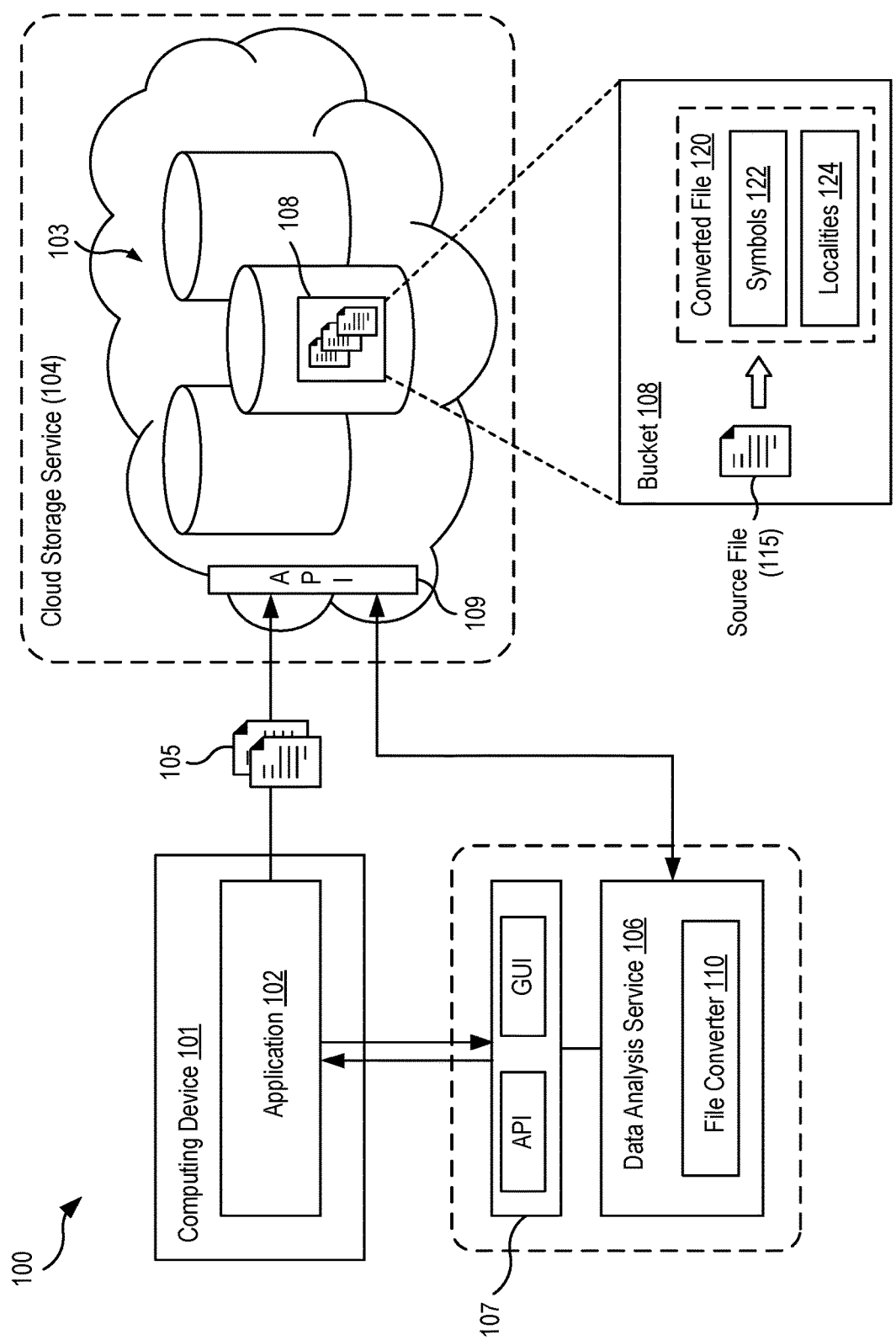
FIG. 1 is a block diagram illustrating a system for processing and analyzing data stored in object storage according to an exemplary aspect.

FIG. 1 is a block diagram illustrating a system 100 for processing and analyzing data stored in object storage according to an exemplary aspect. The system 100 includes a computing device 101 executing an application 102 that is configured to store data 105 in an object storage system 103. In the aspect shown, the object storage system 103 may be provided by a cloud storage service 104. In one example, the application 102 may have a multi-tier software architecture in which user data of the application is stored in a data layer is stored in the object storage 103. The application 102 may be configured to store, retrieve, modify, and/or access data in the object storage system 103 via an application programming interface 109 (API), REST-based interface (e.g., using PUT, GET, LIST operations), or other interfaces exposed by the cloud storage service 104.

The object storage system 103 (also referred to as object-based storage) may include one or more storage devices configured to provide a data storage architecture that manages data 105 as objects, in contrast to a file system-based storage architecture (which manages data in a file hierarchy) or a block-based storage architecture (which manages data as blocks within sectors and tracks of physical media). Examples of object storage include object-based storage provided by such cloud storage services as AWS Simple Storage Service (S3)™ made available by Amazon, Microsoft Azure Storage™, or Google Cloud Storage™. While discussed in the context of public cloud services, it is understood that aspects of the present disclosure may also be applied to "on premise" or private object-based storage systems.

The object storage system 103 is configured to store units of data 105 as "objects" (also referred to as "blobs" in some architectures), and maps each object to a unique identifier (e.g., key, index, object name). For clarity of explanation, the data 105 stored in object storage is interchangeably referred to as "files" in the present disclosure. The object storage system 103 may have a flat hierarchy and include a plurality of buckets 108, which are logical containers for holding the data 105. That is, each object is stored in a particular bucket 108.

The data stored in the object storage system 103 may represent one or more computer files having a variety of file formats and types of data, including text data, binary data, log files, program data files, CSV (comma-separated values) files, XML files, JSON (JavaScript Object Notation) files, image files, audio files, and video files. The data 105 in object storage may be characterized as structured data, unstructured data, or semi-structured data. A structured data file includes data arranged and organized according to a formal data model, such as the row-and-column structure of relational databases or data tables (e.g., CSV files). While not conforming to some formal structure of data model, a semi-structured data file may include data that is organized or annotated according to some pre-defined manner, for example, data that contains tags, markers, and other syntax that separate semantic elements and assign attributes and a hierarchy to the data (e.g., XML, JSON files). An unstructured data file refers to data that lacks a pre-defined data model and is not organized in a pre-defined manner, such as data found in text-heavy files.

Typically, an application 102 may store an amorphous mix (structured data, semi-structured data, and unstructured data) of bulk data in the object storage system 103, resulting in data being stored in a disjointed, disparate, and schemeless manner. As described earlier, buckets 108 might only expose structure by virtue of keys and their associated object or blob. As such, from the point of view of a user, the objects stored in the object storage system 103 may conform to some unspecified structure that is unknown, unless a user downloads and manually inspects them (e.g., and determine the file is a csv or log file).

According to aspects of the present disclosure, the system 100 includes a data analysis service 106 configured to process and analyze the data 105 stored in the object storage system 103. As described in greater detail below, the data analysis service 106 includes a file converter module 110 configured to convert data in object storage to a specialized file format, referred to herein as a "data edge" file format that enables the data analysis service 106 to discover, refine, and query the object storage data. The data edge file format further allows improved compression of the data stored in object storage based on the separation of symbols from their location. The data edge file format models data sources in an edge space representation, of which can be analyzed via complex mathematical algorithms, such as linear algebra computation.

In some aspects, the data analysis service 106 may be configured to process files already stored in object storage, for example, all files contained in a selected bucket 108. In other aspects, the application 102 may store data 105 in object storage using the data analysis service 106 as an intermediary, which in turn converts the data 105 into data edge files stored in object storage.

In one implementation, the data analysis service 106 may be a distributed server application executing on one or more computing devices (not shown). The data analysis service 106 may include an interface 107 that enables the application 102 to discover, refine, and query the data 105 it has stored within its buckets in object storage. In some aspects, the interface 107 may be an API of the data analysis service 106 configured to provide the application 102 programmatic access to the functionality of the data analysis service 106 in relation to the data 105. In one aspect, the API of the data analysis service 106 may be configured to extend or override (i.e., "wrap") the API interface provided by the cloud storage service 104. In other aspects, the interface 107 of the data analysis service 106 may be a command-line or graphical user interface (GUI) of server-based application that enables a user to interactively discover, refine, and query the data 105 stored within object storage.

The data analysis service 106 may process data 105 in object storage in a manner that separates the symbols of a file from their location in the file. In one aspect, the data analysis service 106 may be configured to, given a source file 115 of data, generate a converted file 120 organized into: (1) a symbol portion 122 containing the symbols of the source file 115, and (2) a locality portion 124 containing values representing the respective locations of those symbols in the original source file 115. In some aspects, the data analysis service 106 may create two files from the source file 115: a symbol file (e.g., "filename.I2S", containing the symbol portion 122) and a locality file (e.g., "filename.L2I", containing the locality portion 124). In some implementations, the symbol file and the locality file may be concatenated into one file (e.g., after it is compressed), and in other cases, the symbol file and locality file may be maintained separately. In some aspects, the converted file 120 may further include a metadata portion (e.g., "filename.MDS") that contains metrics, statistics, and other metadata related to the original data source 105, to the data edge file, and to the conversion process performed.

Data compression techniques generally involve encoding some data using fewer bits than its original representation by finding patterns and eliminating redundancy. Consider the simple example of a data source file containing one hundred symbols, in which all symbols are the word "cat". A compressed version of this file may encode this file as "100cat" to eliminate the redundant instances of the symbol "cat," resulting in a data reduction of 300 units of information to 6 units. Data compression algorithms attempt to find common symbols within symbols, as well as sequences represented in a form smaller than its original representation. In another example, a sequence of numbers from one to a million, could be represented as "1ToMillion," with a saving factor of 6 times. It has been determined that as the source file gets larger, it becomes more difficult for a compression algorithm to find common or redundant patterns. Accordingly, the format of the data edge file is configured to organize symbols in a manner that facilitates more efficient data compression.

The following discussion provides detailed examples of converting source files of a variety of data types, including structured data (FIG. 2) such as CSV files, unstructured data (FIG. 4) such as text data, structured data with text values (FIG. 5), and semi-structured data (FIG. 6) such as JSON and XML files.

FIG. 2 is a block diagram depicting a structured data source file 200 and a corresponding converted data edge file 202 according to an exemplary aspect. The source file 200 contains structured data having a plurality of records organized into rows and columns. For example, the source file contains values having symbols (e.g., "A", "1", "E", "5", "F", "D", etc.) arranged in a 4-row by 6-column table format (the row containing column names "Column1", "Column2", etc. is omitted from this discussion). The structured source file 200 is rendered in FIG. 2 in a table format for sake of illustration, but it is understood that the structured data may be encoded in a variety of formats. For example, the source file 200 may be a delimiter-separated file (such as a CSV file) containing a plurality of records (i.e., lines), where each record is comprised fields separated by a delimiter (e.g., comma). In another aspect, the structured source file 200 may be a log file containing a plurality of log entries, e.g., separated by a tab or whitespace character.

The file converter 110 may create a symbol file 204 associated with the source file that contains each unique symbol found in the source file 200. The file converter 110 may perform initial reduction of the source file 200. That is, the file converter 110 finds duplications and removes them, and finds sequences and orders them. In one aspect, the file converter 110 may scan through the file, identifying each unique symbol contained in the source file, order them, and disregard any duplicate symbols encountered. For example, the file converter 110 may identify that the source file 200 contains a duplicate symbol "5" in both the first row, fourth column, as well as the fourth row, sixth column (highlighted by dashed circles). In this case, the file converter 110 only includes a single instance of the symbol "5" in the resulting symbol file 204.

In some aspects, the file converter 110 may represent symbols as "Strings" type. In some cases, it may be more efficient to convert one or more symbols from the source file into a different data type, such as a number or time period (i.e., date/time). These constructs of String, Number, and Time Period allows the data analysis service to order symbols with greater efficiency. Ordering the numbers as strings can produce a different result than using the actual number under alphanumeric ordering. For example, the numerical symbols shown in symbol file 204 are sorted as numbers (1, 2, 3 . . . , 9, 11), rather than as strings, which would produce (1, 11, 2, 3 . . . ).

In one aspect, once the symbols have been reduced and organized, the symbols may be concatenated with a delimiter. In the example shown, the symbols in the symbol file 204 are separated by a vertical bar or pipe character "|". The symbol delimiter may be unique in the context of the symbols, and may also be reduced during the compression operation. In some aspects, each symbol in the symbol file 204 as well as localities in the locality file 206 may be represented in binary format (i.e., as 0 and 1) for improved compression.

The file converter 110 may generate a locality file 206 containing each location of each symbol. The locality file 206 represents the structure of the modeled source (e.g., raw data source). The present disclosure uses the term "position" to refer to a locality within the source file—and the mirrored localities in the locality file—distinguished from the term "location" which is used to refer to a locality or coordinates within the symbol file. If a symbol is in the source file 200 more than once, a new value (representing a symbol location) is added. As shown in FIG. 2, each symbol in the symbol file 204 has a corresponding location (within the symbol file). For example, the symbol "1" is located at location "01"; the symbol "A", at location "09"; and the symbol "L" at location "20" of the symbol file. The position (within the locality file) of a location value is mirror of the raw source file 200. In other words, the locality file 206 may be similar to the source file 200 except that in place of the actual symbol, the locality file 206 has a value representing the location of a particular symbol within the symbol file 204.

For example, in the first row, first column, the locality file has a location value "09" in place of the symbol "A" found in the corresponding position in the source file. In another example, in the first row, third column, the locality file has a location value "13" in place of the "E" symbol found in corresponding spot in the source file. In yet another example, the locality file contains two instances of the location value "05" to represent the two separate occurrences of the symbol "5" in the source file 200.

In one aspect, a location value may be implemented as an integer value that is a simple index or offset relative to the symbol file. For example, a location value "01" represents a first-ordered position in the symbol file. In other aspects, a location value may be coordinate values (e.g., x-y) of a symbol within structured data. In yet other aspect, a location value may be an address of a symbol contained with the symbol file. In some aspects, the location values may be fixed in size (i.e., expanded by adding prefix 0's), and also represented in binary (0s and 1s). The fixed size may allow for a more efficient processing protocol because fixed size fields may have a reduced overhead. In other words, simplified math may be used to find a given symbol in a data source file.

According to an aspect, the converted file format comprised of a symbol file and a locality file may be configured to support lossless compression. That is, the original source file can be recreated from the encoding in the data edge file. For example, to reproduce the original data source, the locality file can be scanned, each location value is used as a lookup index in the symbol file, and the location value is replaced with the retrieved symbol.

Aspects of the present disclosure may store and compress data to its theoretical minimum, e.g., if a data file was compressed using some standard compression tool (e.g. gzip), the resulting file would achieve that particular algorithms theoretical minimum. Unique to Data Edging is its ability adaptive/intelligent organization of the derived locality and symbol files such that it can compress the data source "below" this theoretical minimum even when using the same compression algorithm (e.g. gzip). And yet, in the data analytics world, additional information is added to make information retrieval-performant. This overhead can be greater than the theoretical minimum the file could achieve and at big data scale and can be a tremendous cost. This cost is particularly dubious when cataloguing (i.e. indexing) is required to speed up ever increasing number of specific result set retrievals.

In contrast, the data edge aspects described herein adaptively and/or algorithmically categorize all symbols of a file, unlike other formats where they have to be specified either explicitly or implicitly. And as mentioned previously, indexing is costly with respects to size and time to process. Increasing the amount of indexing slows down the ingestion of a data source, at some point, causing the data organization to virtually stop. A data edge file formats data differently, e.g., with storage format categorizing and compressing as one intrinsic act.

As described above, in some aspects, the compression algorithms may have some difficulty finding patterns when the distance of those patterns is large or disjoined. As a result, the localities in the locality file may be ordered by a row or column orientation, as shown in FIGS. 3A and 3B, respectively, or even by diagonal orientation. FIG. 3A depicts one representation of a locality file 300A in a row-based orientation, having the locations of symbols in the first row, sequentially, followed by the locations of symbols in the second row, and so forth. In these figures and in Figures to follow, the location value is represented in generic terms such as "Location of A", for clarity of illustration. FIG. 3B depicts a representation of a locality file 300B in a column-based orientation, having the location values of symbols from the first column of the source file, sequentially, followed by the location values of symbols from the second column of the source file, and so forth.

Figure 4:
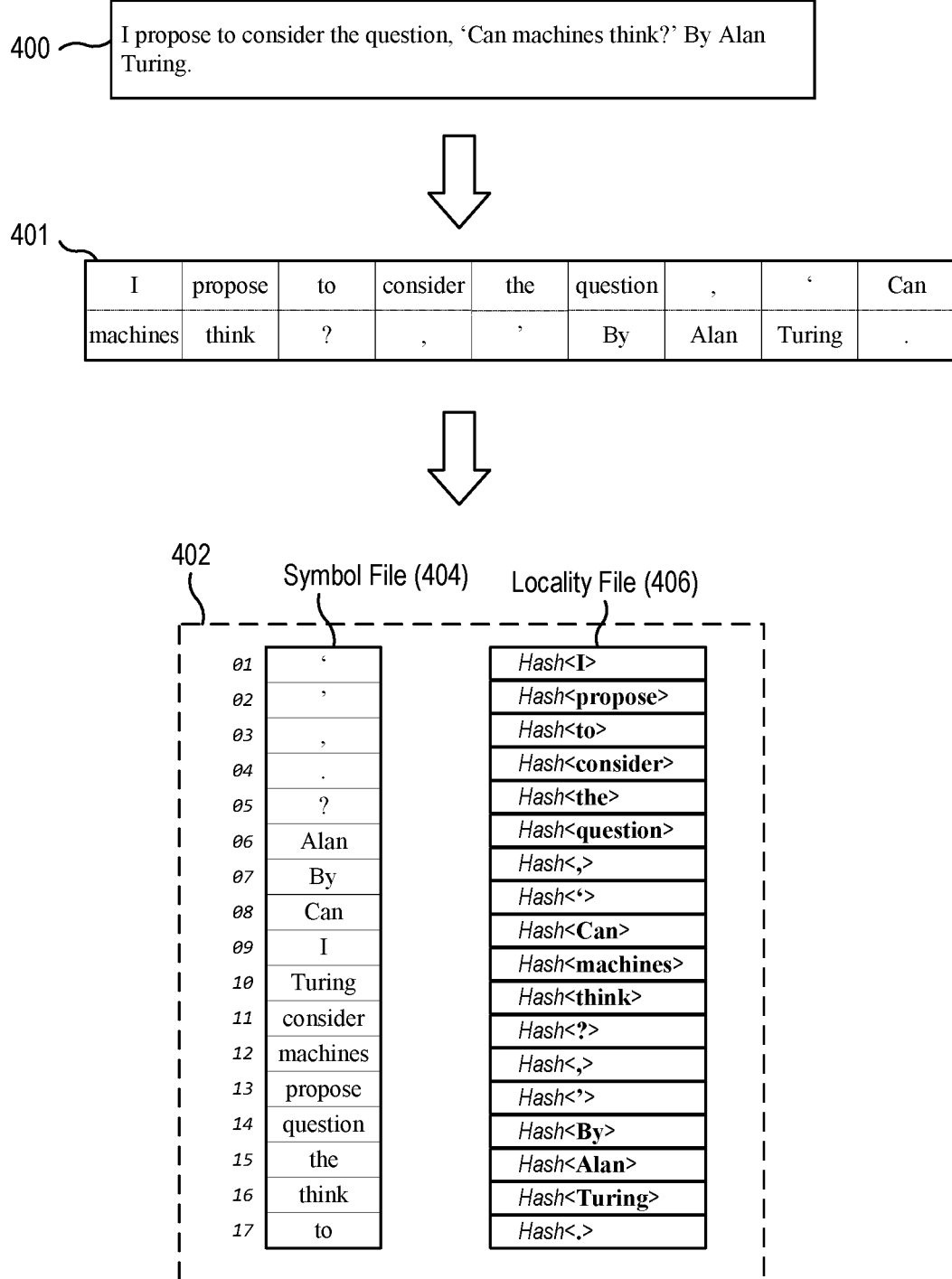
FIG. 4 is a block diagram depicting a conversion of an unstructured data source file to a data edge file according to an exemplary aspect.

FIG. 4 is a block diagram depicting a conversion of an unstructured data source file 400 to a data edge file 402 according to an exemplary aspect. The source file 400 may be a document file having a plurality of text data, such as in plain text files (.txt), rich text format (.rtf), and other document file formats. As used herein, "text data" is a generalized, superset term for a data source that contains a plurality of Strings, and may also contain any combination of plain (not binary) symbols such as Strings, Numbers, Dates, etc. In the example shown, the source file 400 includes a text sentence:

I propose to consider the question, 'Can machines think?'
By Alan Turing.

In one aspect, the data edge format may represent text sources as a continuous stream of data (i.e., left-to-right, up-to-down). It can be seen as a one-dimensional array, where numbers and words are symbols, and (most) special characters are symbols as well (i.e., one column of rows of symbols). Classical text separators, such as spaces, line breaks, tabs, and other whitespace characters, may be used as symbol delimiters. The block 401 depicts a tokenized intermediate version of the text source 400 in which the symbols have been separated by the delimiters.

In one aspect, the file converter 110 may generate a symbol file and locality file in a manner similar to the technique described earlier with regards to structured data. The file converter 110 may create a symbol file 404 associated with the source file that contains each unique symbol found in the source file 400 in a sorted order (e.g., the symbols "Alan", "By", "Can", "I", "Turing", "consider", "machines", "propose", "question", etc., as well as punctuation symbols). The file converter can discard or disregard duplicate symbols (such as the second occurrence of the comma symbol ","). In the end, the symbol file 404 is a sorted array of delimited characters, and the locality file provides the location of those characters in the raw data source (similar to the format of the locality file described earlier). In some cases, this representation may be the most optimal from the standpoint of compression.

Alternatively, the data analysis service 106 may use another mode of representation that allows for unique and optimal text query execution. Since text files are generally smaller than machine-generated files (such as CSV, log files, JSON, and XML data sources), and classic text indexing technology dramatically increases the storage of raw text, this alternative mode of representation is still significantly smaller than traditional text indexing technology, such as an inverted index, as made available in the Apache Lucene software project.

As shown in FIG. 4, in one aspect, the file converter 110 may generate a locality file 406 where the locality is not the coordinates (x,y) of the location of the corresponding symbol in the source file, but rather a fingerprint value (e.g., hash) of the symbol itself. The position of a hash value within the locality file 406 represents the position of the corresponding symbol in the raw text source file 400. For example, the position of the hash value for the symbol "consider" in a fourth position of the locality file 406 indicates that the symbol "consider" is found in a fourth position of the original data file. This variation of representing the locality file enables the locality file to be used for text-based search without needed to refer to the symbol file. If the locality file contains hashes of symbols (rather than their coordinates), then a symbol lookup need only analyze the locality file.

According to aspects, the mapping of hash-to-symbol can be inferred since reproduction of raw source is available by hashing symbols. Lossless compression is still supported in this variant aspect. The original raw source can be recreated by hashing the symbols in the symbol file, and with these hashes, reproducing the structure of the source by matching the hashes in the locality file. The advantage of this is now the locality file 406 no longer needs to reference the symbol file 404 to answer text query operations regarding the text data. Additionally, since locality files are matrices of number, high performance multidimensional mathematical libraries (e.g., linear algebra operations) can be used, as well as, simple and fast bitwise operations (e.g., bit map operations). For instance, the data analysis service 106 may take a symbol or phrase of symbols, convert them into hash values, and then searched/positioned into these matrices.

In one implementation, the file converter 110 use a hash algorithm, such as MetroHash, to generate the fingerprint value corresponding to each symbol identified in the source file 400. In some implementations, the fingerprint value may have a size of 64 bits or more to reduce the likelihood of hash collisions. In some aspects, the data analysis service 106 may further maintain a hash lookup table (e.g. hash to count) to reduce the size of locality files. It should also be noted that all languages can be represented in the data edge file format. In other words, the outlined directional flow of data edge files is an internal representation and has no adverse effects with respects to reproduction and/or symbol search/position.

For well-formed structured data sources (e.g., CSV) that are of basic data types (e.g. Boolean, number, string), a 2-dimensional locality model may suffice (see FIG. 2 above). However, as data sources become more complex, additional dimensions are added. For instance, the data edge file format models text column sources as a new dimension per each row. The reason is that each text row column can have a different format and shape, even though conceptually it is perceived as the same column. Text data may be thought of an array type of symbols, and when part of a complex data source, have their own story, and deserve its own dimensionality. In other words, the change of shape introduces a new dimension. And yet, the representation of dimensions, both in memory and on disk, is a one dimensional array, partitioned into n-number of dimensions.

One can view each one of these dimensions as a vector space, where a vector is a directional sequence of points. Thus, a locality is a data point, as part of a vector, describing a data source structure. And to reiterate, locality is what models the format and shape of a data source. Symbols, on the other hand, have no relationship to a data source's format and shape. Symbols are typically represented as one-dimensional. However, dimensions can be introduced based on the type of symbol (e.g., Booleans, numbers, strings, and dates are all different vectors).

Figure 5:
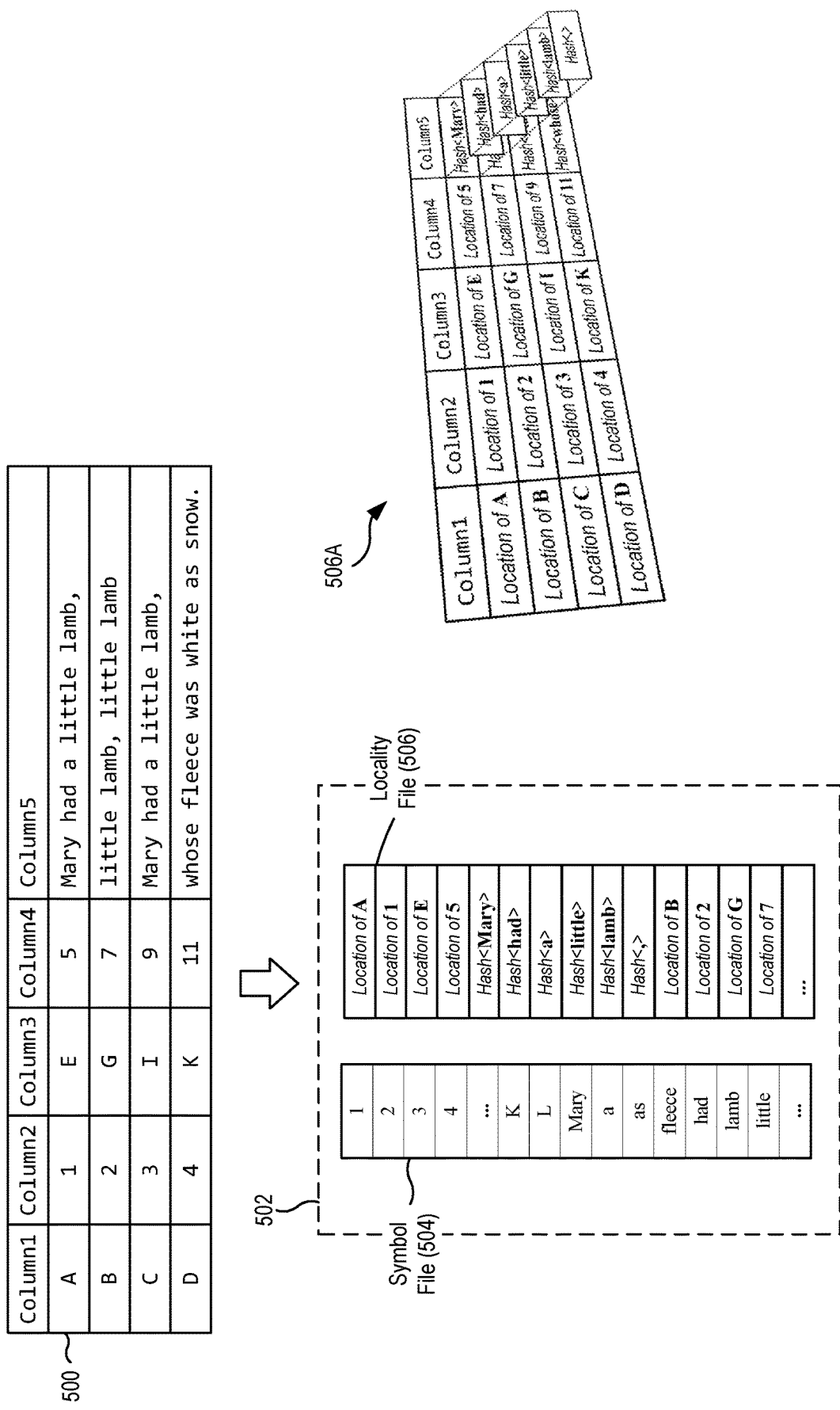
FIG. 5 is a block diagram depicting a conversion of a structured data source file having text data to a data edge file according to an exemplary aspect.

FIG. 5 is a block diagram depicting a conversion of a structured data source file 500 having text data to a data edge file 502 according to an exemplary aspect. The source file 500 is similar to the example structured data source file 200, except that for the presence of a column of text data (i.e., "Column5"). In contrast to the other columns of data having simple data types (e.g., "A", "1", "E", "5"), the text column includes sequences of text (e.g., "Mary had a little lamb").

The data edge file 502 for the structured data source file 500 having a text column may include a symbol file 504 and a locality file 506. The file converter 110 may create the symbol file 504 associated with the source file that contains each unique symbol found in the source file 500 in a sorted order. As shown, this includes symbols of the basic data types found in the columns 1-4 (e.g., "A", "1", "E", "5"), as well as symbols parsed in the text column (e.g., "Mary", "a", "as", "fleece", "had").

The file converter 110 may further create the locality file 506 having a combination of location values indicating the location of each symbol in the symbol file 504, as well as fingerprint values of symbols from the text column. The positions of the location and hash values are mirrors of the raw data source 500. For example, the locality file 506 contains, at a first position of the locality file itself, a location value (depicted generically as "Location of A") representing where the corresponding symbol "A" can be found in the symbol file 504. In a further example, the locality file 506 also contains a plurality of hash values for symbols of text data at a position within the locality file 506 corresponding to Column5. The locality file 506 for a structured data source may be modeled as two-dimensional structure corresponding to the rows and columns of the structured data source, with the addition of a third dimension corresponding to a sequence of text data found in at least one of the cells. In other words, a CSV can be a two-dimensional matrix where the text column can be viewed as a third dimension starting at the location of the row and column coordinates. This three-dimensional concept is depicted in the form of the locality file 506A shown in FIG. 5.

Figure 6:
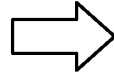
FIG. 6 is a block diagram depicting a conversion of a semi-structured data source file to a data edge file according to an exemplary aspect.

The conversion of semi-structured data sources (e.g., JSON and XML) into a data edge file may follow all the same principles that have discussed earlier for unstructured data sources (e.g., Text) and structured data sources (e.g., CSV, log data sources) and their combinations thereof. FIG. 6 is a block diagram depicting a conversion of a semi-structured data source file 600 to a data edge file 602 according to an exemplary aspect. The example source file 600 is a JSON file having data in the form of a plurality of name-value pairs that describe an entity (e.g., "Company X"). In the example shown, the JSON data includes data specifying a name field, an address field, and an employees field (which contains an array of employee names).

In one aspect, the semi-structured data source 600 may be transformed into a two-dimensional representation. First, the file converter 110 may generate a flattened representation 601 of the semi-structured data. In one aspect, the flattened representation 601 may include a plurality of columns corresponding to the keys of the JSON object, and a row of data corresponding to values of the JSON object. In the example shown, the "name" field is transformed into a first "name" column. The "address" object is transformed into separate columns, each column representing a name-value pair in the address object (e.g., "address.street", "address.city", "address.state"). The "employees" array is transformed into separate columns, each column for each element in the array (e.g., "employees[0]", "employees[1]", "employees[2]").

After generating this two dimensional structure 601, the file converter may proceed to generate a symbol file and a locality file associated with the semi-structured data source 600. Similar to the earlier examples, the file converter 110 may create a symbol file associated with the semi-structured source file that contains each unique symbol found in the value data of the name-value pairs of the semi-structured data, in a sorted order. The file converter 110 may further create a locality file containing the location values of the symbols in the symbol file.

It should be noted that both JSON and XML (by definition) cannot be malformed and would be considered invalid. These data sources are described as semi-structured. In the case of processing an invalid JSON/XML data source, the file converter 110 will model it as a one dimensional text array and can be considered unstructured (i.e. a list vector of directional symbols).

In another aspect, the data edge representation of complex structures such as JSON and XML is simply an extension of the same multidimensional description, constructs, and rules as discussed earlier. For instance, JSON can be viewed as a human readable data format and can be viewed as an object, but without the methods. In other words, these structure can model Booleans, numbers, strings, arrays, and maps (i.e. objects), as well as, any combination thereof.

In one aspect, in the case of log-file data sources, there is typically an underlying structure for each line of log records. In other words, log files are similar to CSV files where this said structure is the delimitation. As a result, data edged representation of log files can be treated similarly to the aspects described in conjunction with CSV files. When there is a line that has no discernible structure (i.e. like delimitation to other lines), these symbols can be view as text. And like CSV with text, the data edging follows an identical process for representation.

It should be noted that most, if not all, relational analytic databases do not support text types or text search, nor does text search database support true relational operations. The support of both relational and text queries by aspects of the present disclosure, in one technology, has significant benefits both from a cost and complexity perspective.

Using the data edge file format, the file converter 110 can model these types and combinations. Types such as basic types (e.g. Boolean, number, string, and date) are identified as symbols, with each having a locality of reference. An array of types is the same construction like the Data Edge text (symbols) based one dimensional array. A map is a symbol to another dimension that can be another symbol, list, and/or map. In the case of a map, the locality is a special locality that references the symbol and another locality of reference.

Figure 7:
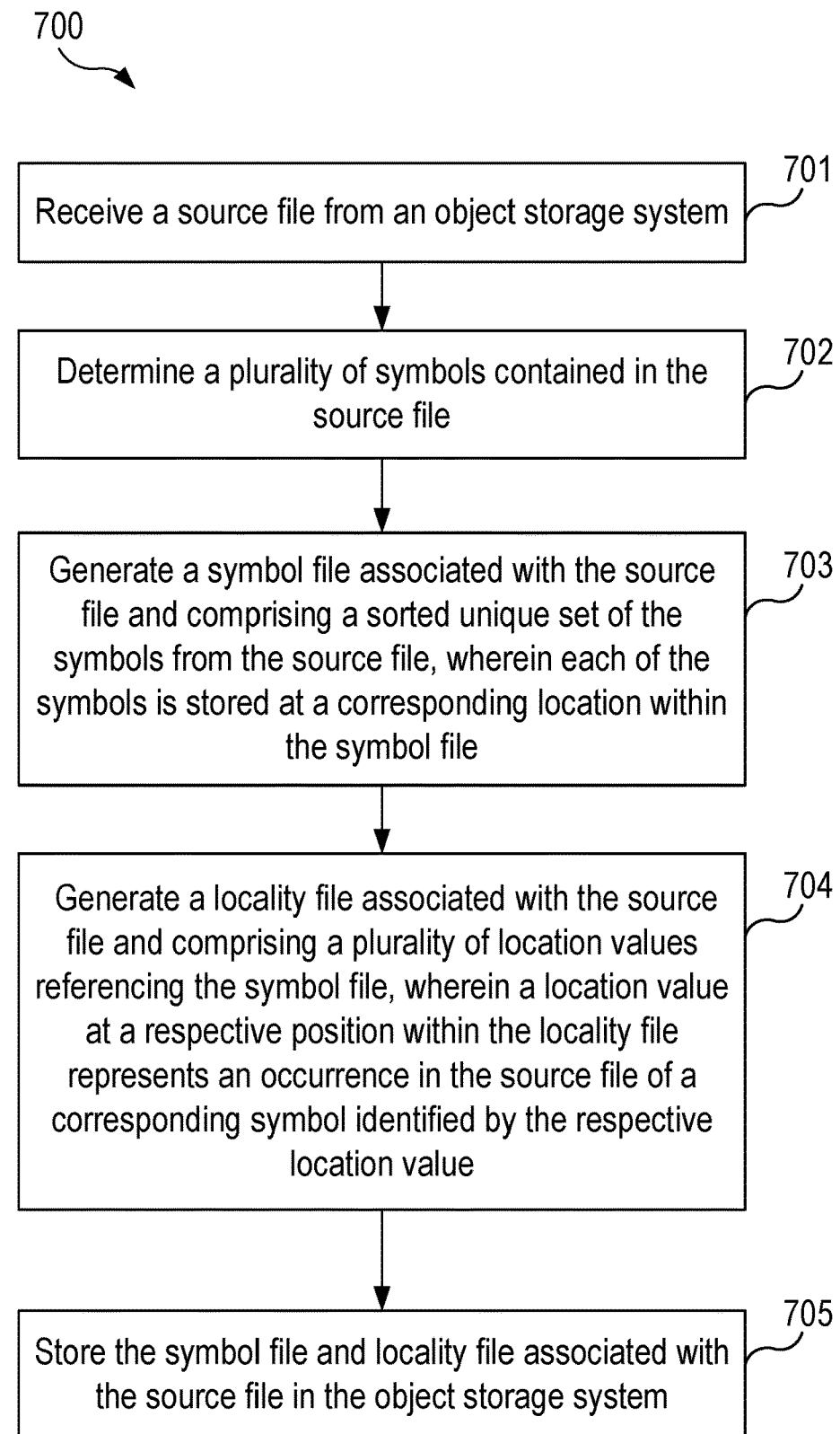
FIG. 7 is a flowchart illustrating a method for processing and storing a file in object storage according to an exemplary aspect.

FIG. 7 is a flowchart illustrating a method 700 for processing and storing a file in object storage according to an exemplary aspect. The method may be performed by the data analysis service 106, by a sub-component of the data analysis service 106, such as the file converter 110, or by the object storage system 103. It is noted that the following description of the exemplary method makes reference to the system and components described above.

The method 700 begins at step 701, which a data analysis service 106 (e.g., using a file converter 110) receives, from an object storage system 103, one or more source files 115. The file converter 110 may convert the received source files 115 to a data edge file format to facilitate later discovery, refinement, and query operations. For example, FIG. 2 illustrates an example of conversion of a source file having structured data such as CSV files into at least one symbol file and at least one locality file. In another example, FIG. 4 illustrates an example of a conversion of a source file having unstructured data such as text data into a symbol file and a locality file. In yet another example, FIG. 5 illustrates an example of a conversion of a source file having structured data with a text column into a symbol file and a locality file. Finally, FIG. 6 illustrates a conversion of a source file having semi-structured data such as JSON and XML files into a symbol file and a locality file.

At step 702, the file converter 110 determines a plurality of symbols contained in the source file. The file converter 110 may scan through the file to identify individual symbols contained in the source file, using some predetermined character(s) as delimiters between symbols (e.g., such as whitespace). At step 703, the file converter 110 generates a symbol file 122 associated with the source file 115 and comprising a sorted unique set of the symbols from the source file. Each of the symbols is stored at a corresponding location within the symbol file. In some aspects, the sorted unique set of the symbols in the symbol file are concatenated together with a delimiter.

At step 704, the file converter 110 generates a locality file 124 associated with the source file 115 and comprising a plurality of location values referencing the symbol file. A location value at a respective position within the locality file represents an occurrence in the source file of a corresponding symbol identified by the respective location value. In some aspects, the source file may comprise structured data, and the location values are ordered within the locality file by one of a row orientation or a column orientation. For example, the source file comprises at least one of a comma-separated values (CSV) file having a plurality of records, each record comprising a plurality of fields separated by a delimiter character.

In one aspect, the file converter 110 may identify a type of data contained in the source file, for example, based on a file extension of the file, based on metadata associated with the file identifying the type of data, or based on an inspection of the file itself. Responsive to determining that the source file comprises unstructured text data, the file converter 110 may generate a plurality of fingerprint values based on the determined plurality of symbols contained in the source file. The file converter 110 may then generate the locality file comprising the plurality of fingerprint values. A fingerprint value based on a corresponding symbol and at a respective position within the locality file represents an occurrence in the source file of the corresponding symbol.

In another aspect, responsive to determining that the source file comprises semi-structured data, the file converter 110 may transform the semi-structured data into a two-dimensional structure prior to generating the locality file. In one example, the source file comprising semi-structured data is formatted as at least one of a JavaScript Object Notation (JSON) file, and an extensible markup language (XML) file.

At step 705, the file converter 110 stores the symbol file and locality file associated with the source file in the object storage system 103. In some aspects, the file converter 110 stores the symbol file and the locality file in a same bucket 108 as the source file in the object storage system. In some aspects, the file converter 110 may generate a data edge file 120 that is comprised of the symbol file concatenated with the locality file. In some aspects, the data analysis service 106 may search the source file by querying the locality file associated with the source file.

Figure 8:
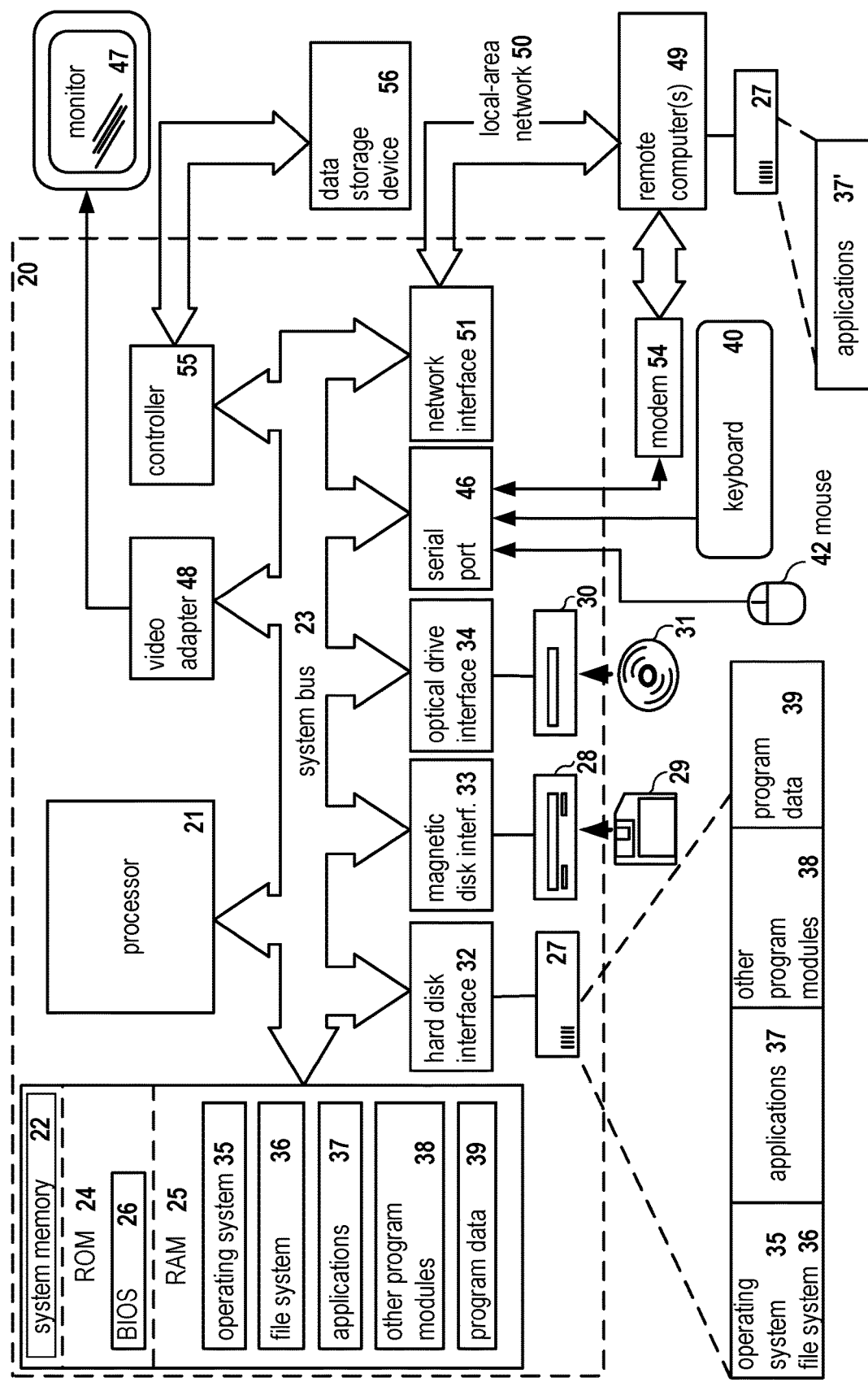
FIG. 8 is a block diagram of a computer system on which the disclosed system and method can be implemented according to an exemplary aspect.

FIG. 8 is a block diagram illustrating a computer system 20 on which aspects of systems and methods for processing files stored in object storage systems may be implemented in accordance with an exemplary aspect. It should be noted that the computer system 20 can correspond to the computing device 101, the object-based storage system 103, and the physical server(s) on which the data analysis service 106 is executing, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 8, above). Accordingly, each module may be realized in a variety of suitable configurations, and should not be limited to any particular implementation exemplified herein.

Figure 9:
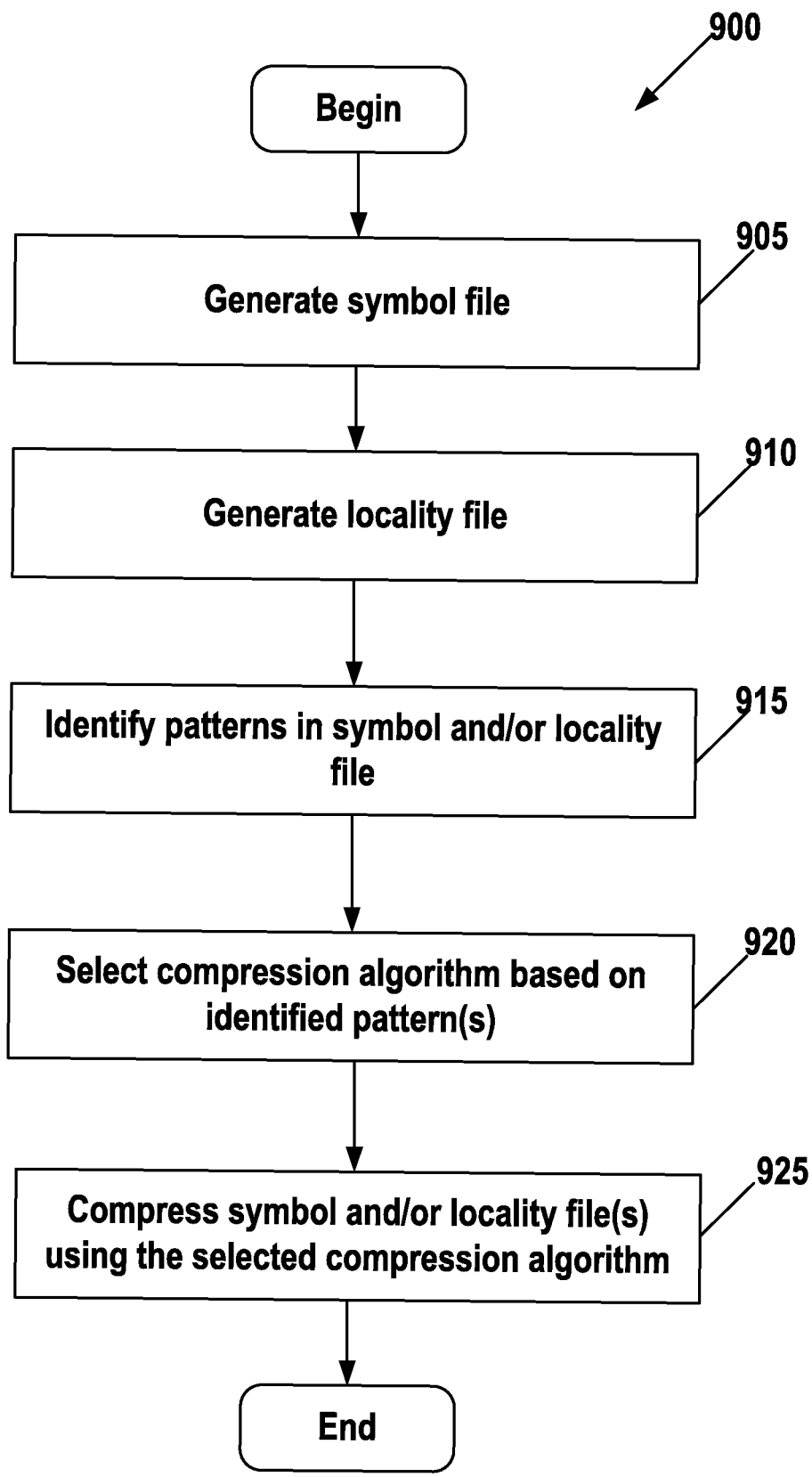
FIG. 9 is a flowchart illustrating a method for organizing and compressing a data file according to an exemplary aspect.

FIG. 9 illustrates a process 900 for organizing and compressing a data file by using data edging. Although illustrated separately, the process of FIG. 9 may be performed in combination with the process of any of FIGS. 7, 10 and/or 11. The process 900 may be performed by a computer system such as the computer system 20, e.g., a data edging system.

At 905, a symbol file is generated based on the discovered data file or source file. The symbol file may comprise all of the symbols found in the data file. At 910, a locality file is generated. The locality file was discussed in detail above. The locality file may comprise the locations of all of the symbols in the symbol file. The locality file and symbol file are derived from the source file such that each symbol in the symbol file has at least one associated locality in the locality file.

Additionally, locality files may be created to represent a combination of two or more source files. Thus, multiple source files may be aggregated by creating a combined locality file, e.g., as described in connection with FIGS. 2-7.

At 915, patterns are identified in the symbol file and/or the locality file. At 920, a compression algorithm is selected based on the identified pattern(s). Such a compression algorithm may be selected such that the minimal storage space is required to store the file and compression is lossless. At 925, the symbol and/or locality file(s) are compressed using the selected compression algorithm.

By separating the source file into a locality file and a symbol file, it may become more efficient to manage data in a datastore. This is because data analysis, manipulation, and queries can be handled without decompressing the symbol file. Instead, simple modifications may be made to the locality file to update the data in the source file, as will be discussed with reference to the following figures.

Figure 10:
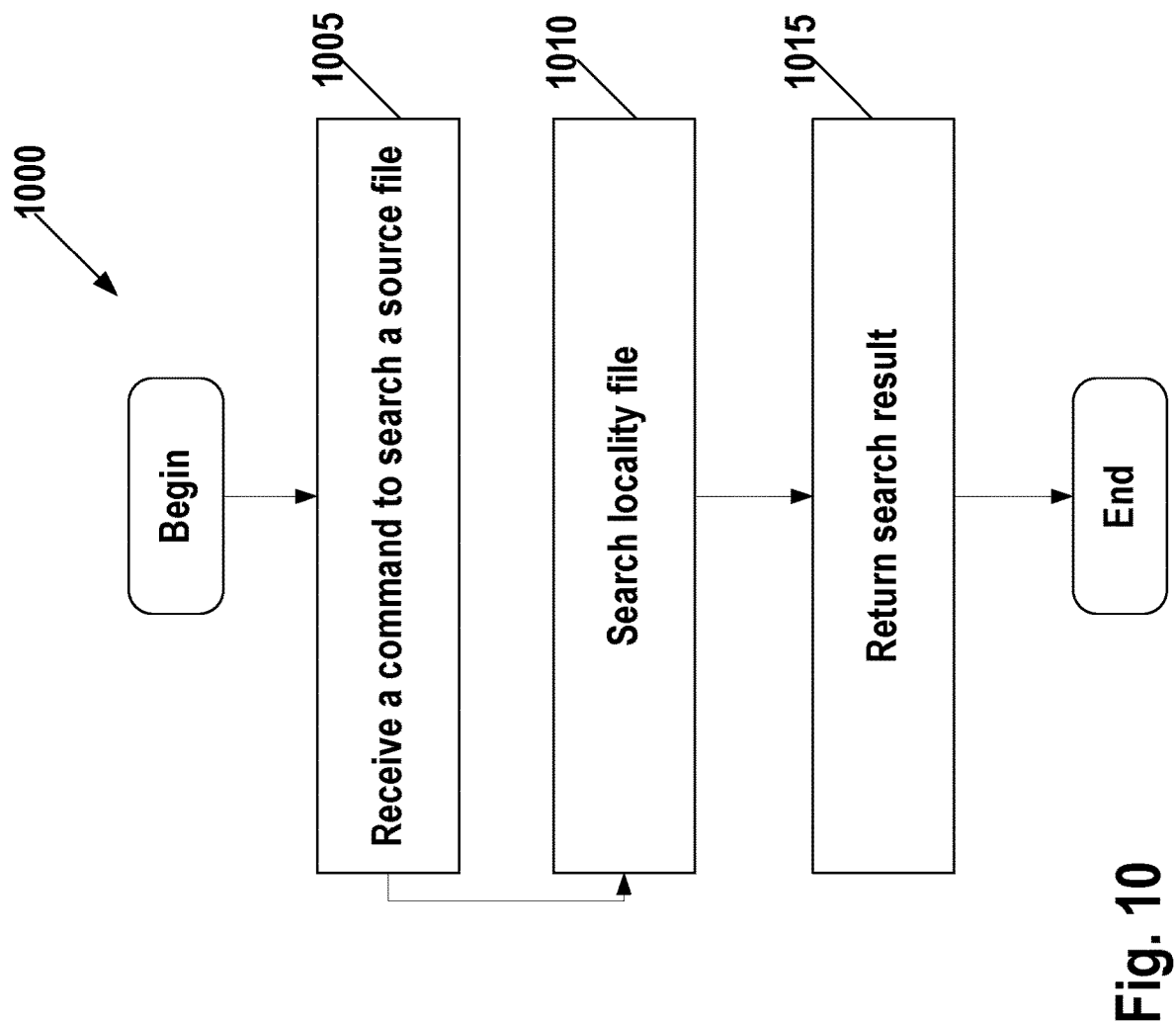
FIG. 10 is a flowchart illustrating a method for searching for a source file that has been compressed according to an exemplary aspect.

FIG. 10 conceptually illustrates a process 1000 for searching a source file that has been compressed using the data edging techniques discussed above. Although illustrated separately, the process of FIG. 10 may be performed in combination with the process of any of FIGS. 7, 9 and/or 11. The process 1000 may be performed by a computer system such as the computer system 20, e.g., a data edging system. The process 1000 may begin, e.g., after a source file has been compressed using data edging.

At 1005, a command may be received to search a source file, e.g., as described in connection. The query may be based on relational constructs, e.g., column stores, as well as symbol positioning such as found in text stores. The search may be performed for a data file and/or information of a virtual bucket that has been created by filtering and/or combining information in files from multiple object groups. Examples of searches may include, e.g., the SQL SELECT statement or a similar statement/command that is capable of initiating a search any suitable database format and returning a result. Other searches may include text based searches such as keyword, Boolean, phase and/or wildcard searches. At 1010, a locality file is searched for the location of a symbol in relation to the source file. At 1015, a result may be returned based on the location of a symbol as determined from searching the locality file. As a result, the symbol file may remain compressed or unmodified because the search result is obtained from the locality file. Thus data edging may be more efficient because it is not necessary to decompress the symbol file to perform searches or, as will be discussed below, manipulations to a data file.

Figure 11:
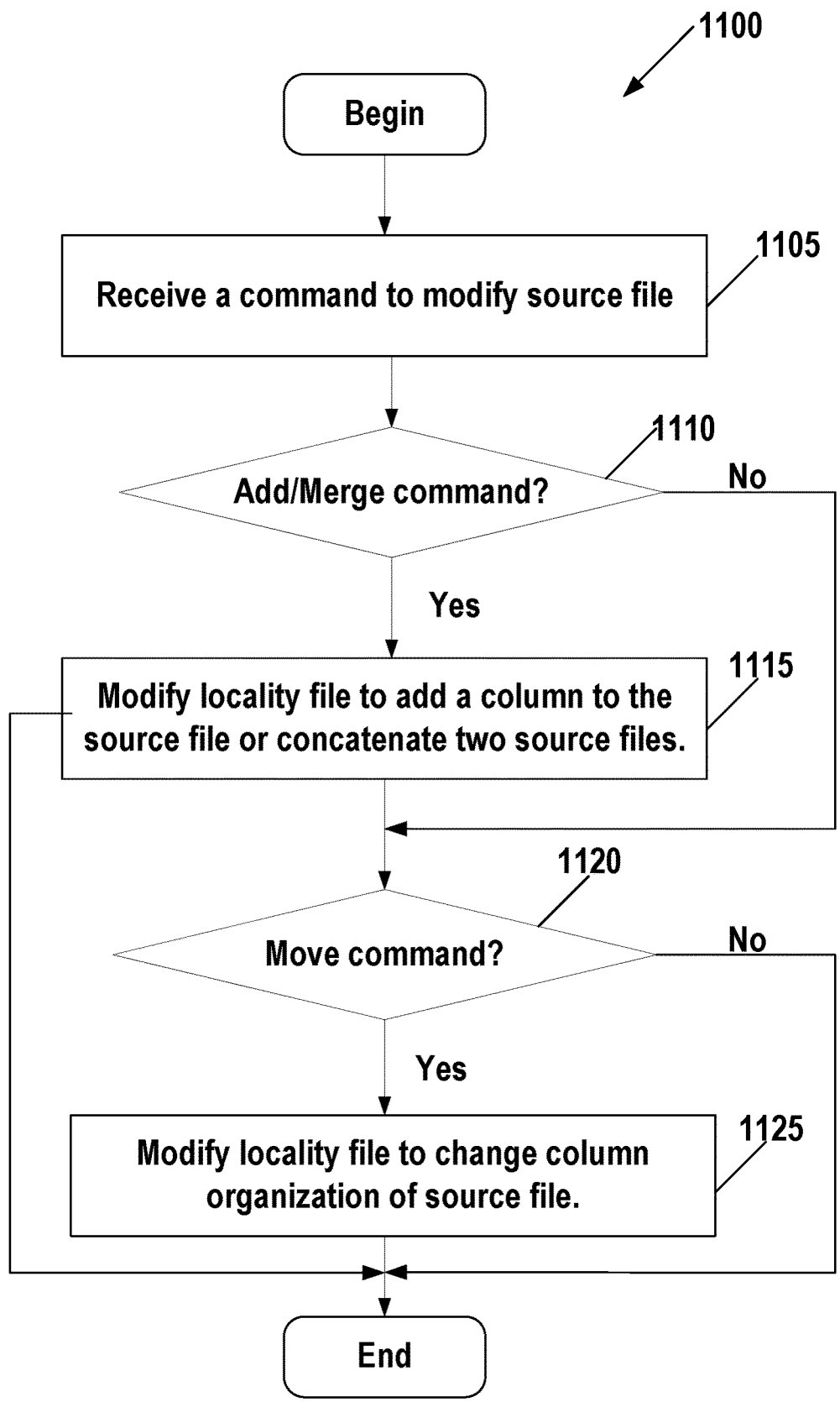
FIG. 11 is a flowchart illustrating a method for manipulating a data file according to an exemplary aspect.

FIG. 11 illustrates a process 1100 for manipulating a data file using the data edging techniques discussed above. Although illustrated separately, the process of FIG. 11 may be performed in combination with the process of any of FIGS. 7, 9 and/or 10. The process 1100 may be performed by a computer system such as the computer system 20, e.g., a data edging system. The process 1100 may begin after a source file has been compressed using the data edging techniques discussed above.

At 1105, a command is received to modify a source file. The command may comprise a command to reorder and/or reshape a source file. For example, shaping may including or exclude information from the source file. In one example, a source file with 4 columns may be reshaped to remove one of the columns. In another example, two source files may be reshaped by combining information from the two source files together. Reordering may involve moving the locality of symbols within a file. These changes may be achieved through updates to the symbol and/or locality files. The process 1100 determines (at 1110) if an add/merge command was received. An add/merge command may be a command to add a column to a relational data file, or text to a text file. In addition, the add/merge command may be a command to concatenate at least 2 source files. When it is determined that an add/merge command was received, the locality file may be modified at 1115 to add a column to the source file or concatenate two (or more) source files. The process then ends. When it is determined that an add/merge command was not received, a determination may be made at 1120 whether a move command was received. A move command may be a command to move data in a source file. For instance, a move command may be to move a column of a relational data file or move text of a text file. When it is determined at 1120 that a move command was received, the locality file may be modified at 1125 to change the column organization of the source file. However, in the case of a text file, the locality file may be modified to associate a new location with a particular symbol or set of symbols.

Figure 12:
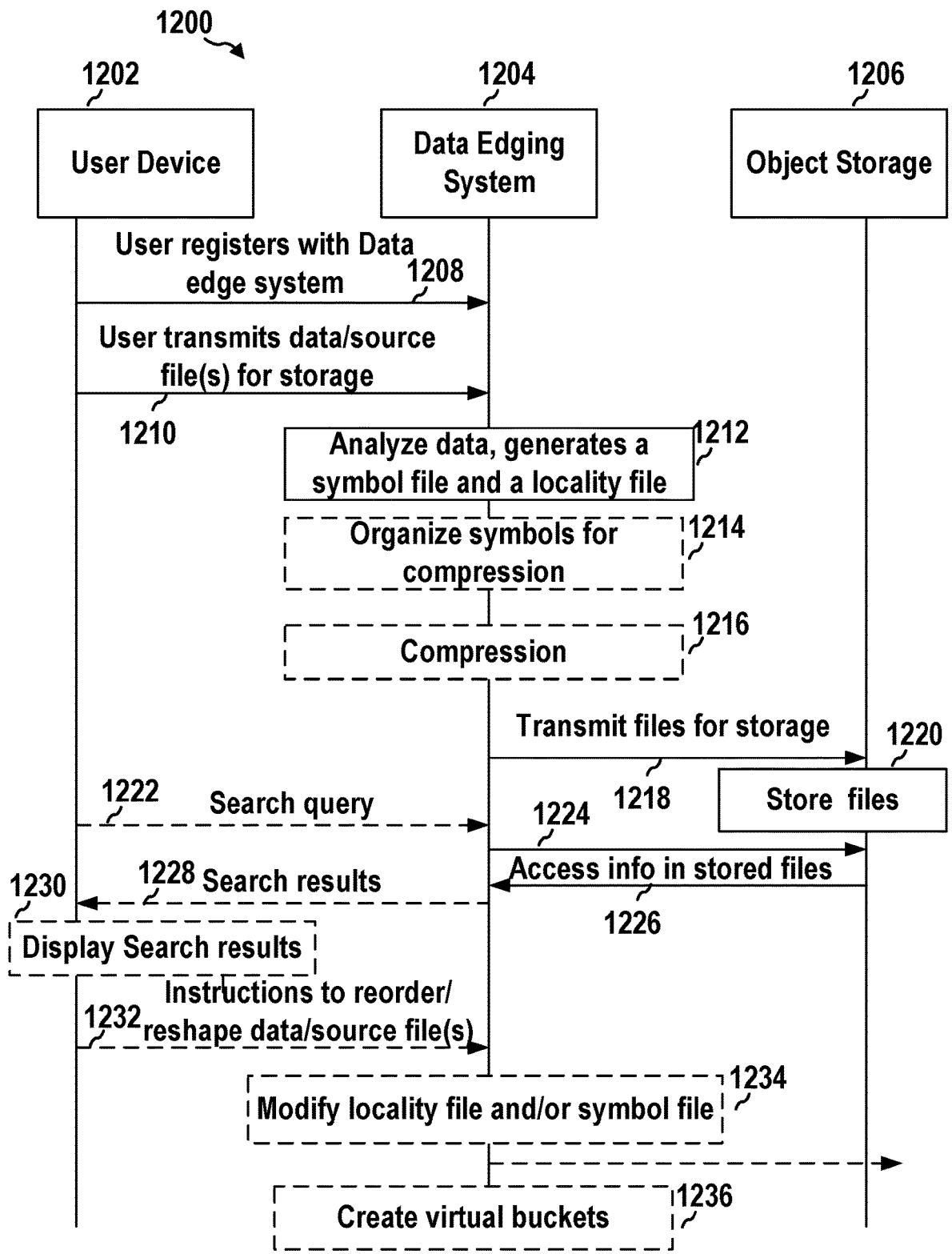
FIG. 12 is a diagram illustrating example aspects of a communication flow between a user, a data edging system, and simple object storage.

FIG. 12 illustrates a communication flow 1200 involving a data edging system 1204 that interacts with a user device 1202 and object storage 1206 to provide analysis, organization, compression, and access to data stored in object storage. The data edging system 1204 may comprise a processing system (e.g., as described in connection with FIG. 8) with a communication link to the user device 1202 and object storage 1206 via a network. The object storage may comprise a datastore that is accessible by users (e.g., user devices 1202) and the data edging system 1204, e.g., via a network. While examples are presented for interacting with third party object storage, in another example, the object storage may be an additional component of the data edge system.

The data edging system 1204 may provide users with a serverless, always on, highly scalable, zero admin service. In such edging systems, users may not need to provision hardware resources in advance. Instead resources may be dynamically allocated or elastically scaled up/down as demand goes up/down respectively. It may comprise an always on data platform, and may automatically scale up and down based on the user's workload. The user does not need to worry about configuration, or provisioning. The data edging system may comprise, e.g., an abstraction layer provided on top of the simple object storage. In an example architectural stack, the data edging may be provided between object storage and a user interface. All of the simple object storage functionality may be supported by the aspects presented herein and may be either a pass-through or intercepted to provide additional discover, refine, and query capabilities for the object storage data.

Data may be transformed from multiple data source types, e.g., unstructured text source files, structured source files (e.g., CSV), and semi-structured source files, into a more tabular representation via data edging, such that the tabular representation can be exported to a tabular format (e.g. CSV). The source files may be uploaded into physical buckets of simple object storage. The data edging may format the source files and transform them into virtual buckets.

Initially, the user device may register 1208 with the data edge system 1204, e.g., providing information to generate a user account and enable the user to log in to a user interface of the data edge system. The user device may also provide access information and/or credentials to link the user account at the data edge system to a user account at the object storage 1206. The access information may include user account information for the object storage. As the object storage may be third party object storage, the access information and/or credentials may enable the data edge system to access the user's stored data at the object storage. The access may include uploading data, downloading data, etc. Although not illustrated, the data edge system may also provide credentials to the user device that the user may use to enter at the object storage to provision third party access to the user's object storage by the data edge system. The data edge system may enable the user to configure the type of access, e.g., setting roles and selecting/deselecting access between the third party object storage and the data edge system.

The data edging system 1204 may interact with both the user device 302 and the object storage 1206 to enable the user to upload files to third party object storage 302, download files from the third party object storage 1206, create folders, buckets, etc. using buttons presented at a user interface, e.g., similar to the user's interaction with the third party object storage. Simple object storage may comprise buckets where a user puts, gets, and lists files/objects in a file directory structure. The data edging system may provide a user interface and application programming interface (API) that substantially mirrors the functionality of the user's simple object storage. However, in addition to these features, the data edging system 1204 may provide an intelligent platform that provides multiple phases of analytic data pipelines, e.g., discover, refine, and query, to provide access to data stored in simple object storage with reduced complexity. Thus, the user interface and API may include additional features and extensions that enable the user to explore what is in their buckets, providing distribution metrics, which can be grouped into result sets called virtual buckets, that may be used for analytics. The user interface may comprise a drag and drop studio or a REST based interface.

The data edging system may be non-disruptive and may provide a logical lens the user can use to derive unique insights, either graphically via the user interface or programmatically via the API, into the data stored in their simple object storage. For instance, the data edging system may provide a type of "read only" view, where object views are virtually, rather than physically transformed and may be queried without the need for object model transformation(s).

After registering, the user device 1202 may upload, at 1210, source files for storage at object storage 1206. Upon receiving the source files, the data edging system 1204 may analyze the data of the source file and generate a symbol file and a locality file at 1212 to represent the source file. At 1214, the symbols may be organized for compression. At 1216, the data edging system 1204 may select a compression algorithm and may compress the symbol file and/or the locality file, as described herein. The data edging system then transmits the data, e.g., compressed locality file and compressed symbol file, to the object storage 1206, at 1218. At 1220, the object storage stores the received files.

After files are stored at the object storage, the user device may send a search query 1222 regarding the stored files to the data edging system 1204. For example, the search query may include requests such as a relational FIND, ORDER, GROUP, JOIN (two sources), and then perform aggregations (e.g. MIN, MAX, SUM, AVG, STD, COUNT etc.) commands. In another example, the search query may perform a text search request such as SEARCH/MATCH for particular input words or phrases as well as parameters for force inclusion (i.e., "+" operand) and for exclusion (i.e., "−" operand). The data edging system may access the information in the stored files, at 1224, 1226, in order to perform analytics on the stored files, e.g., as described in connection with any of FIGS. 2-7, 9, 10, and 11. At 1228, the data edging system may provide the search results 1228 to the user device, e.g., via a user interface. The user device may the display the results 1230 to the user. In some aspects, the search query creates additional result sets (e.g., virtual buckets) that can have additional queries perform on them. In other words, aspects of the present disclosure permit the ability to compound additional analysis and precision via said queries.

At 1232, the user device may send instructions to the data edging system to reorder/reshape the source files that were previously stored. The data edging system may reorder/reshape the source files by modifying the locality file for the symbol location in the source files at 1234. The modifications to the locality file may be provided to the object storage.

Additionally, the user may create virtual buckets of files without modifying the underlying files and physical buckets. The virtual buckets may be stored.

Analytics commands for information in a virtual bucket may include any of Sum, Minimum, Maximum, Average (of columns), etc.

Each virtual bucket may have a corresponding key specification that dictates how keys are derived from the tabular data in order to populate the listing of each virtual bucket. A key specification may be detailed by an ordered list of columns from the schema of the virtual bucket and describes how these keys are constructed.

A key may be derived from a row by extracting the values corresponding to the columns in the key spec and concatenating them together, in key spec order, using "/" as a delimiter between values. For example, for tabular source data with columns, "foo", "bar", and "baz" as in Table 1, a virtual bucket with a key spec of [foo, baz], would contain the following keys 1/Z 2/Y, 3/X.

TABLE 1

| foo | bar | baz |
|-----|-----|-----|
| 1   | a   | Z   |
| 2   | b   | Y   |
| 3   | c   | X   |

And a virtual bucket same source and a key spec of [baz, foo, bar] would contain X/3/c, Y/2/b, Z/1/a.

To list the keys in a virtual bucket, you can simply issue a standard S3 GET Bucket (List Objects) Version 2 request on the bucket. In addition to the standard requirements for this call, the following restrictions may be imposed on the parameters when the target is a virtual bucket:
  list-type—Only supports "2" (GET Bucket Version 2)
  delimiter—Only supports "/"
  prefix—Only valid for prefix values comprised of whole key parts
  Prefix "foo/" will match key "foo/bar"
  Prefix "foo/ba" will not match key "foo/bar"

Along with a key specification, each virtual bucket may also have an associated row specification describing the source and order of each column in the virtual bucket. The object data corresponding to a key in a virtual bucket may be the set of rows, in csv format, which would produce that key according to the key specification for the virtual bucket. Columns of the resulting csv appear in the order given by the row specification, and rows may be presented in ascending key order.

A virtual bucket may be represented by the following data in Table 2 (with columns in row spec order):

TABLE 2

| foo | bar | baz |
|-----|-----|-----|
| 1   | a   | Z   |
| 2   | b   | Z   |
| 3   | b   | Z   |

With a key specification of [bar], it would produce the following object data for keys "a" and "b":
  a->1,a,Z
  b->2,b,Z
   3,b,Z To retrieve the row data for a given key in a virtual bucket, a GET Object request can be issued on the key targeting that bucket. In certain aspects, there might not be support of the available GET Object request header or URI query parameters when targeting virtual buckets.

However, an extension to GET Object behavior may be provided, e.g., which may be referred to as a common prefix GET Object. This common prefix GET object may extend the valid keys for a GET Object request to any valid key prefix for the bucket. A GET Object request specifying a key prefix instead of a fully qualified key may be serviced as if the virtual bucket had a key specification with only the supplied key parts.

Using the data from the previous example above, a virtual bucket with a key specification of [baz, bar, foo] would produce the following object data for the given common prefix requests:
  Z/a->1,a,Z
  Z/b->2,b,Z
     3,b,Z
  Z->1,a,Z
    2,b,Z
    3,b,Z Similar to support for the prefix parameter of GET Bucket object listing, common prefix values may be comprised of complete key parts (delimited by "/") to match any keys. Moreover, common prefix GET Object requests might only be valid on virtual buckets, e.g., not on physical buckets.

Aspects presented herein support analysis via the virtual bucket construct. The following are the four example aspects to virtual bucket querying: common prefix search; point and range reads search; wildcarding prefixing, start, end, sub; and aggregation functions, e.g., sum, average, count, minimum, maximum, standard, etc.

When specifying a path for a GET Object or GET Bucket (List Objects) request on a virtual bucket, support may be provided for either literal paths or path constraints specified in the query language.

Path constraints specified in the query language may be designed to resemble literal paths. For example, 3QL constraints are "/" delimited strings, where the characters after the nth (and before the n+1th) delimiter represent a constraint on the nth column in the key spec of the virtual bucket. Thus, for a key specification of [foo,bar,baz], then the path constraint may have the form /[foo constraint]/[bar constraint]/[baz constraint].

Column constraints may be paired with the virtual bucket key spec from left to right. It is possible for the query path constraint to contain fewer column constraints than columns in the virtual bucket key spec. In this case, the rightmost columns from the key spec without corresponding query constraints may be considered unconstrained. Since column constraints are positional, it may be possible to identify a constrained column by either its name or an underbar ("_"). It may otherwise be an error to specify a component of a path constraint with a column name that doesn't match the corresponding column in the key spec for the virtual bucket.

Literals specified in constraints may be raw or quoted. Both single and double quotes can be used to quote string literals (and may be nested, unescaped, within one another). Example point/range constraints may include:

|          |                                  | Examples |
|----------|----------------------------------|----------|
| Equality |                                  |          |
|          | [column\|_]=[literal\|${column}] | foo=3    |
|          |                                  | foo=${bar} |
|          |                                  | foo=hello |
|          |                                  | foo='say "hi"' |

-continued

|  | Examples |
|---|---|
| Range | |
| [column\|_][<\|<=][literal\|${column}] | foo<5 |
| [column\|_][>\|>=][literal\|${column}] | foo>=${bar} |
| [literal\|${column}][<\|<=][column\|_][<\|<=][literal\|${column}] | 1<=foo<4 |
|  | apple<foo<=banana |

Example string matching constraints may include:

|  | Examples |
|---|---|
| Prefix | |
| [column\|_]=[literal]* | foo=hello wor* |
| Suffix | |
| [column\|_]=*[literal] | foo=*lo world |
| Wildcard | |
| [column\|_]=* | foo=* |

In addition to the constraint specification, it may also be possible to specify an aggregation function to apply to the result set of a GET Object request on a virtual bucket. This may be done by adding an aggregation prefix to the query constraint: Example aggregation functions may include:

| Aggregations | Examples |
|---|---|
| count:[path constraint] | Count:/foo>3 |
|  | count:/bar=Boston |
| [sum\|avg\|std\|min\|max]([column]):[path constraint] | sum(foo):/1<=foo<5/bar=Hello* |
|  | min(bar):/foo=5 |

TABLE 3

| foo | bar | baz |
|---|---|---|
| 1 | apple | Boston |
| 2 | application | Somerville |
| 3 | banana | Medford |
| 4 | cat | Medford |

For an example dataset in Table 3, a Key spec: [baz,foo, bar] may correspond to:

| /baz=Boston | -> 1,apple,Boston |
| /baz=Med* | -> 3,banana,Medford |
|  | 4,cat,Medford |
| count:/_=*/foo>=2 | -> 3 |
| sum(foo):/baz=Medford | -> 7 |

In an example workflow according to the aspects presented herein, the user may: identify a physical bucket in simple object storage you wish to explore and report on; direct the service to discover file distribution to be logically grouped; create logical file group filters either automatically or manually; select a group to model that executes a deep data analysis, refine modelled groups once modeling is complete; and refining aggregates multi groups that can be shaped, correlated, and sorted. Once refinement is complete, the logical result set may be, e.g., a virtual bucket. The virtual buckets may look and act like physical buckets while also supporting analytic queries.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A computer-implemented method for storing a file in object storage, comprising:
   receiving, from an object storage system comprising a plurality of source files, a source file containing raw data;
   determining a plurality of symbols contained in the raw data of the source file;
   generating a symbol file associated with the source file, the symbol file comprising a sorted unique set of the plurality of symbols from the source file, each unique symbol of the plurality of symbols being stored at a different respective location of a plurality of locations within the symbol file;
   generating a locality file associated with the source file, the locality file comprising a plurality of location values referencing the plurality of locations within the symbol file, a location value at a respective position within the locality file representing an occurrence in the source file of a corresponding symbol identified by a respective location value;

storing the symbol file and the locality file associated with the source file in the object storage system, the symbol file and the locality file providing a lossless representation of the raw data of the source file;

receiving a search query for information included in the plurality of source files;

querying at least one of the symbol file and the locality file associated with the source file based on the search query; and displaying a result for the search query based in part on the raw data of the source file, the result for the search query returned without accessing the source file.

2. The method of claim 1, further comprising:
generating a data edge file comprising the symbol file concatenated with the locality file.

3. The method of claim 1, wherein the source file comprises structured data, and wherein the plurality of location values are ordered within the locality file by one of a row orientation or a column orientation.

4. The method of claim 3, wherein the source file comprises at least one of a comma-separated values (CSV) file having a plurality of records, each record of the plurality of records comprising a plurality of fields separated by a delimiter character.

5. The method of claim 1, further comprising:
responsive to determining that the source file comprises unstructured text data:
generating a plurality of fingerprint values based on the plurality of symbols contained in the source file; and
generating the locality file comprising the plurality of fingerprint values, wherein a fingerprint value based on the corresponding symbol and at the respective position within the locality file represents the occurrence in the source file of the corresponding symbol.

6. The method of claim 1, further comprising:
responsive to determining that the source file comprises semi-structured data, transforming the semi-structured data into a two-dimensional structure prior to generating the locality file.

7. The method of claim 6, wherein the source file comprising the semi-structured data is formatted as at least one of a JavaScript Object Notation (JSON) file, and an extensible markup language (XML) file.

8. The method of claim 1, wherein returning the result of the search query includes:
querying the locality file associated with the source file.

9. The method of claim 1, wherein returning the result of the search query includes:
searching the symbol file and determining an associated location from the locality file associated with the symbol file.

10. The method of claim 1, wherein the search query comprises one of a relational construct and a text search.

11. The method of claim 1, wherein the symbol file and the locality file are stored in a same bucket as the source file in the object storage system.

12. The method of claim 1, wherein the sorted unique set of the plurality of symbols in the symbol file are concatenated together with a delimiter.

13. The method of claim 1, further comprising:
selecting a compression algorithm based on a composition of at least one of the symbol file and the locality file; and
compressing the locality file using the compression algorithm.

14. The method of claim 13, wherein the compression algorithm is selected to achieve maximum compression based on organized symbols.

15. The method of claim 13, wherein the compression algorithm is selected based on pattern recognition.

16. The method of claim 1, further comprising:
receiving a command to transform a shape of the source file; and
modifying the locality file to transform a file format of the source file based on the command.

17. The method of claim 1, further comprising:
receiving a command to reorganize the source file; and
modifying the locality file such that a decompressed symbol file comprises a representation of the source file reorganized according to the command.

18. The method of claim 17, wherein the command to reorganize comprises a reorder command to reorder the plurality of symbols contained in the source file.

19. The method of claim 17, wherein the source file comprises a plurality of columns, and wherein the command to reorganize the source file comprises a reshape command to reshape at least one column of the plurality of columns of the source file.

20. The method of claim 19, wherein the command to reshape the at least one column of the plurality of columns of the source file comprises removing a column from the source file.

21. The method of claim 19, wherein the command to reshape the at least one column of the plurality of columns of the source file comprises concatenating a second plurality of columns from a second source file with the plurality of columns from the source file.

22. The method of claim 17, further comprising:
receiving a query to search the source file; and
using the modified locality file and the symbol file to return a query result based on respective locations of the plurality of symbols in the source file.

23. The method of claim 17, wherein the symbol file is unchanged.

24. The method of claim 1, wherein the source file is a first source file, the method further comprising aggregating the first source file and a second source file.

25. A computer apparatus for storing a file in object storage, comprising:
memory; and
at least one processor coupled to the memory and configured to:
receive, from an object storage system comprising a plurality of source files, a source file containing raw data;
determine a plurality of symbols contained in the raw data of the source file;
generate a symbol file associated with the source file, the symbol file comprising a sorted unique set of the plurality of symbols from the source file, each unique symbol of the plurality of symbols being stored at a different respective location of a plurality of locations within the symbol file;
generate a locality file associated with the source file, the locality file comprising a plurality of location values referencing the plurality of locations within the symbol file, a location value at a respective position within the locality file representing an occurrence in the source file of a corresponding symbol identified by a respective location value;

store the symbol file and the locality file associated with the source file in the object storage system, the symbol file and the locality file providing a lossless representation of the raw data of the source file;

receive a search query for information included in the plurality of source files;

query at least one of the symbol file and the locality file associated with the source file based on the search query; and display a result for the search query based in part on the raw data of the source file, the result for the search query returned without accessing the source file.

26. A non-transitory computer-readable medium storing computer executable code for storing a file in object storage, comprising code to:

receive, from an object storage system comprising a plurality of source files, a source file containing raw data;

determine a plurality of symbols contained in the raw data of the source file;

generate a symbol file associated with the source file, the symbol file comprising a sorted unique set of the plurality of symbols from the source file, each unique symbol of the plurality of symbols being stored at a different respective location of a plurality of locations within the symbol file;

generate a locality file associated with the source file, the locality file comprising a plurality of location values referencing the plurality of locations within the symbol file, a location value at a respective position within the locality file representing an occurrence in the source file of a corresponding symbol identified by a respective location value;

store the symbol file and the locality file associated with the source file in the object storage system, the symbol file and the locality file providing a lossless representation of the raw data of the source file;

receive a search query for information included in the plurality of source files;

query at least one of the symbol file and the locality file associated with the source file based on the search query; and display a result for the search query based in part on the raw data of the source file, the result for the search query returned without accessing the source file.

* * * * *